United States Patent
Lah et al.

(10) Patent No.: US 7,399,384 B2
(45) Date of Patent: Jul. 15, 2008

(54) COKE DRUM BOTTOM THROTTLING VALVE AND SYSTEM

(75) Inventors: Ruben F. Lah, West Jordan, UT (US); Gary Larsen, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 90 days.

(21) Appl. No.: 11/353,299

(22) Filed: Feb. 13, 2006

(65) Prior Publication Data

US 2006/0175188 A1 Aug. 10, 2006

Related U.S. Application Data

(62) Division of application No. 10/274,280, filed on Oct. 18, 2002, now Pat. No. 6,843,889.

(60) Provisional application No. 60/408,537, filed on Sep. 5, 2002.

(51) Int. Cl.
*C10B 25/00* (2006.01)

(52) U.S. Cl. .............................. 201/3; 201/41; 202/217; 202/221; 202/222; 202/239; 202/244; 202/245; 202/270

(58) Field of Classification Search ................ 202/217, 202/221, 222, 239, 244, 245, 270; 201/3, 201/41
See application file for complete search history.

(56) References Cited

U.S. PATENT DOCUMENTS

| | | |
|---|---|---|
| 176,321 A | 4/1876 | Kromer |
| 900,206 A | 10/1908 | Reed |
| 1,656,355 A | 1/1928 | Huffmann |
| 1,991,621 A | 2/1935 | Noll |
| 2,064,567 A | 12/1936 | Riley |
| 2,245,554 A | 6/1941 | Court |
| 2,317,566 A | 4/1943 | Utterback |
| 2,403,608 A | 7/1946 | Payne et al. |
| 2,562,285 A | 7/1951 | Timmer |
| 2,717,865 A | 9/1955 | Kimberlin et al. |
| 2,734,715 A | 2/1956 | Knox |
| 2,761,160 A | 9/1956 | Manning |
| 3,215,399 A | 11/1965 | McInerney et al. |
| 3,379,623 A | 4/1968 | Forsyth |
| 3,617,480 A | 11/1971 | Keel |
| 3,646,947 A | 3/1972 | Rochelle et al. |
| 3,716,310 A | 2/1973 | Guenther |
| 3,837,356 A | 9/1974 | Selep et al. |
| 3,852,047 A | 12/1974 | Schlinger et al. |

(Continued)

OTHER PUBLICATIONS

Catalog: Velan Valve Corporation, 1980, 40 pages.

(Continued)

*Primary Examiner*—N. Bhat
(74) *Attorney, Agent, or Firm*—Kirton & McConkie; Michael F. Krieger

(57) ABSTRACT

A coke drum bottom de-heading system having an internal shroud enclosure and a shroud end cap opened by a flange to a coke bottom de-heading valve capable of accepting the end of a gate valve upon actuation. Acting in coordination with the shroud enclosure to prevent the escape of steam is a gate seal assembly having a gate seal slidably engaged against the sliding gate to prevent the passage of steam thereby.

12 Claims, 5 Drawing Sheets

U.S. PATENT DOCUMENTS

| | | | |
|---|---|---|---|
| 4,125,438 A | 11/1978 | Kelly et al. | |
| 4,174,728 A | 11/1979 | Usnick et al. | |
| 4,253,487 A | 3/1981 | Worley et al. | |
| 4,275,842 A | 6/1981 | Purton et al. | |
| 4,492,103 A | 1/1985 | Naumann | |
| 4,531,539 A | 7/1985 | Jandrasi et al. | |
| 4,611,613 A | 9/1986 | Kaplan | |
| 4,626,320 A | 12/1986 | Alworth et al. | |
| 4,666,585 A | 5/1987 | Figgins et al. | |
| 4,726,109 A | 2/1988 | Malsbury | |
| 4,738,399 A | 4/1988 | Adams | |
| 4,771,805 A | 9/1988 | Maa | |
| 4,797,197 A | 1/1989 | Mallari | |
| 4,824,016 A | 4/1989 | Cody et al. | |
| 4,923,021 A | 5/1990 | Courmier et al. | |
| 4,929,339 A | 5/1990 | Elliott, Jr. et al. | |
| 4,959,126 A | 9/1990 | Tong et al. | |
| 4,960,358 A | 10/1990 | DiGiacomo et al. | |
| 5,024,730 A | 6/1991 | Colvert | |
| 5,035,221 A | 7/1991 | Martin | |
| 5,041,207 A | 8/1991 | Harrington et al. | |
| 5,048,876 A | 9/1991 | Wallskog | |
| 5,076,893 A | 12/1991 | Tong et al. | |
| 5,107,873 A | 4/1992 | Clinger | |
| 5,116,022 A | 5/1992 | Genreith et al. | |
| 5,221,019 A | 6/1993 | Pechacek et al. | |
| 5,228,525 A | 7/1993 | Denney et al. | |
| 5,228,825 A | 7/1993 | Fruchtbaum et al. | |
| 5,299,841 A | 4/1994 | Schaefer | |
| 5,417,811 A | 5/1995 | Malsbury | |
| H1442 H | 6/1995 | Edgerton et al. | |
| 5,464,035 A | 11/1995 | Heinecke | |
| 5,581,864 A | 12/1996 | Rabet | |
| 5,785,843 A | 7/1998 | Antalffy et al. | |
| 5,794,729 A | 8/1998 | Van Meter et al. | |
| 5,800,680 A | 9/1998 | Guerra | |
| 5,816,505 A | 10/1998 | Tran et al. | |
| 5,816,787 A | 10/1998 | Brinkerohoff et al. | |
| 5,876,568 A | 3/1999 | Kindersley | |
| 5,927,684 A | 7/1999 | Marx et al. | |
| 5,947,674 A | 9/1999 | Malsbury et al. | |
| 6,007,068 A | 12/1999 | Dellacorte | |
| 6,039,844 A | 3/2000 | Malik | |
| 6,066,237 A | 5/2000 | Kindersley | |
| 6,095,493 A * | 8/2000 | Velan | 251/214 |
| 6,113,745 A | 9/2000 | Maitland et al. | |
| 6,117,308 A | 9/2000 | Ganji | |
| 6,223,925 B1 | 5/2001 | Malsbury et al. | |
| 6,228,225 B1 | 5/2001 | Meher-Homji | |
| 6,254,733 B1 | 7/2001 | Lu et al. | |
| 6,264,797 B1 | 7/2001 | Schroeder et al. | |
| 6,264,829 B1 | 7/2001 | Antalffy et al. | |
| 6,367,843 B1 | 4/2002 | Fetzer | |
| 6,547,250 B1 | 4/2003 | Noble et al. | |
| 6,565,714 B2 * | 5/2003 | Lah | 202/245 |
| 6,644,436 B2 | 11/2003 | Hofmann et al. | |
| 6,644,567 B1 | 11/2003 | Adams et al. | |
| 6,660,131 B2 * | 12/2003 | Lah | 202/245 |
| 6,738,697 B2 | 5/2004 | Breed | |
| 6,751,852 B2 | 6/2004 | Malsbury et al. | |
| 6,843,889 B2 * | 1/2005 | Lah et al. | 202/245 |
| 6,926,807 B2 | 8/2005 | Bosi et al. | |
| 6,935,371 B2 | 8/2005 | Stares | |
| 6,964,727 B2 * | 11/2005 | Lah | 202/244 |
| 6,989,081 B2 | 1/2006 | Lah | |
| 7,033,460 B2 * | 4/2006 | Lah et al. | 202/217 |
| 7,037,408 B2 | 5/2006 | Wilborn et al. | |
| 7,115,190 B2 | 10/2006 | Lah | |
| 7,117,959 B2 | 10/2006 | Lah | |
| 7,316,762 B2 | 1/2008 | Lah | |
| 2002/0134658 A1 | 9/2002 | Lah | |
| 2002/0157897 A1 | 10/2002 | Hofmann et al. | |
| 2002/0166862 A1 | 11/2002 | Malbury et al. | |
| 2002/0170814 A1 | 11/2002 | Lah | |
| 2003/0047153 A1 | 3/2003 | Kubel et al. | |
| 2003/0089589 A1 * | 5/2003 | Malsbury | 202/262 |
| 2003/0127314 A1 | 7/2003 | Bell et al. | |
| 2003/0159737 A1 | 8/2003 | Stares | |
| 2003/0185718 A1 | 10/2003 | Sellakumar | |
| 2004/0118746 A1 | 6/2004 | Wilborn et al. | |
| 2004/0154913 A1 | 8/2004 | Lah | |
| 2004/0238662 A1 | 12/2004 | Paul | |
| 2005/0269197 A1 * | 12/2005 | Beala et al. | 202/245 |

OTHER PUBLICATIONS

Seminar Materials, "3rd Annual Universal Delayed Coking Seminar," held Oct. 26-28, 1998 in Santa Monica, California, 45 pages.
Seminar Materials, "Delayed Coking Process Technology," presented by Refining Process Services, Inc. Apr. 20-22, 1999 in Houston, Texas, 89 pages.
Curtiss-Wright Flow Control Corp., Notice of Lawsuit and Request for Waiver of Service of Summons to Z&J Technologies GMBH., Apr. 20, 2006.
U.S. District Court for the Central District of California, Case Reassignment to Judge Otero, Order, Apr. 27, 2006.
U.S. District Court for the Central District of California, Initial Standing Order, Order, Apr. 27, 2006.
Zimmermann & Jansen, Inc., Certification and Notice of Interested Parties, May 9, 2006.
Curtiss-Wright Flow Control Corp. & Zimmermann & Jansen, Inc., Joint Stipulation RE Extension of Time to Respond to Complaint, Court Pleading, May 9, 2006.
Burdman, Neblett, and Supko, Pro Hac Vice Application, Court Pleading, May 15, 2006.
U.S. District Court for the Central District of California, Neblett Order to Appear, Order, May 22, 2006.
U.S. District Court for the Central District of California, Berdman Order to Appear, Order, May 22, 2006.
U.S. District Court for the Central District of California, Supko Order to Appear, Order, May 22, 2006.
Z&J Technologies GMBH, Proof of Waiver of Service, Court Pleading, Jun. 2, 2006.
Arroyo, Blas, Application to Appear, Court Pleading, Jun. 8, 2006.
U.S. District Court for the Central District of California, Notice of Minutes of Scheduling Conference, Order, Jun. 15, 2006.
Curtiss-Wright Flow Control Corp. & Z&J Technologies GMBH & Zimmermann and Jansen, Inc., Stipulation and Order to Continue Scheduling Conference, [Proposed] Order, Jul. 3, 2006.
Z&J Technologies GMBH, Certificate and Notice of Interested Parties, Jul. 19, 2006.
Z&J Technologies GMBH & Zimmermann & Jansen, Inc., Application to File Under Seal Confidential Documents in Support of Their Opposition to Curtiss-Wright's Motion for Preliminary Injunction, Court Pleading, Jul. 20, 2006.
Malik, Jitendra, Application to Appear, Court Pleading, Jul. 26, 2006.
U.S. District Court for the Central District of California, Malik Order to Appear, Order, Jul. 31, 2006.
U.S. District Court for the Central District of California, Joint Rule 26(f) Report, Aug. 4, 2006.
U.S. District Court for the Central District of California, Hearing Date Vacated, Order, Aug. 7, 2006.
U.S. District Court for the Central District of California, Scheduling Conference, Order, Aug. 14, 2006.
U.S. District Court for the Central District of California, Order Denying Curtiss-Wright's Motion for Preliminary Injunction, Order, Sep. 7, 2006.
U.S. District Court for the Central District of California, Stipulated Protective Order, Order, Nov. 21, 2006.
Curtiss-Wright Flow Control Corp., Memorandum in Support of Motion for Summary Judgment on Claim Construction Issues, Court Pleading, Jan. 16, 2007.

Curtiss-Wright Flow Control Corp., Notice of Motion and Motion for Summary Judgment on Claim Construction Issues, Court Pleading, Jan. 16, 2007.

Curtiss-Wright Flow Control Corp., Declaration of Dennis R. Gallagher in Support of Curtiss-Wright's Memorandum in Support of Motion for Summary Judgment on Claim Construction Issues, Court Pleading, Jan. 16, 2007.

Curtiss-Wright Flow Control Corp., Joint Claim Construction Statement in Support of Curtiss-Wright's Motion for Summary Judgment on Claim Construction Issues, Court Pleading, Jan. 16, 2007.

Z&J Technologies GMBH & Zimmermann & Jansen, Declaration of Amy C. Christensen in Support of Z&J Technologies GMBH & Zimmermann & Jansen's Memorandum in Response to Curtiss-Wright's Motion for Summary Judgment on Claim Construction Issues, Court Pleading, Feb. 15, 2007.

Z&J Technologies GMBH & Zimmermann & Jansen, Defendants Memorandum in Response to Curtiss-Wright's Motion for Summary Judgment on Claim Construction Issues, Court Pleading, Feb. 15, 2007.

Curtiss-Wright Flow Control Corp. and Z&J Technologies GMBH & Zimmermann & Jansen, Stipulation to Continue Pretrial Schedule and [Proposed] Order, Court Pleading, Feb. 22, 2007.

Curtiss-Wright Flow Control Corp., Declaration of Dennis R. Gallagher in Support of Curtiss-Wright's Reply Memorandum in support of Curtiss-Wright's Motion for Summary Judgment on Claim Construction Issues, Court Pleading, Feb. 26, 2007.

Curtiss-Wright Flow Control Corp. Reply Memorandum in support of Motion for Summary Judgment on Claim Construction Issues, Court Pleading, Feb. 26, 2007.

Curtiss-Wright Flow Control Corp. and Z&J Technologies GMBH & Zimmermann & Jansen, Revised Stipulation to Continue Pretrial Schedule and [Proposed] Order, Court Pleading, Mar. 5, 2007.

U.S. District Court for the Central District of California, Transcript of Claim Construction Hearing, Transcript, Mar. 19, 2007.

U.S. District Court for the Central District of California, Order RE Curtiss-Wright's Motion for Claim Construction, Order, Apr. 6, 2007.

Curtiss-Wright Flow Control Corp. Curtiss-Wright's Notice of Motion and Motion for Relief from Claim Construction Order, Court Pleading, Apr. 19, 2007.

Curtiss-Wright Flow Control Corp., Declaration of Dennis R. Gallagher in Support of Curtiss-Wright's Motion for Relief from Claim Construction Order, Court Pleading, Apr. 19, 2007.

Curtiss-Wright Flow Control Corp., Memorandum in Support of Curtiss-Wright's Motion for Relief from Claim Construction Order, Court Pleading, Apr. 19, 2007.

U.S. District Court for the Central District of California, Minutes from Hearing RE Curtiss-Wright's Motion for Relief from Claim Construction Order, Minutes, Apr. 23, 2007.

Z&J Technologies GMBH & Zimmermann & Jansen, Defendant's response to Curtiss-Wright's Request for Reconsideration of the Court's Claim Construction Order, Court Pleading, May 7, 2007.

U.S. District Court for the Central District of California, Order Denying Curtiss-Wright's Motion for Relief from Claim Construction Order, Order, May 16, 2007.

Steven W. Sparks, Agreement to be Bound by Protective Order, Court Pleading, May 30, 2007.

Z&J Technologies GMBH & Zimmermann & Jansen, Defendant's Motion for Summary Judgment Of Noninfringement of U.S. Patent No. 6,565,714, Court Pleading, Jun. 4, 2007.

U.S. District Court for the Central District of California, Order Denying Stipulated Supplement to Protective Order, Order, Jun. 6, 2007.

Z&J Technologies, Reply Memorandum in support of Motion for Summary Judgment of Noninfringement of U.S. Patent No. 6,565,714 (Jul. 02.2007).

Z&J Technologies, Declaration of Amy C Christensen is support of reply memorandum in support of motion for summary judgement of noninfringement of U.S.>Patent No. 6,565,714 (Jul. 02, 2007).

U.S. District Court, Central District of California, Minutes of in Chambers Order held before Judge S. James Otero regarding motion for Summary Judgement, hearing date is vacated. (Jul. 03, 2007).

Z&J Technologies, Memorandum in Opposition to Curtiss-Wright, Motion for Continuance (Jul. 03, 2007).

Curtiss-Wright Flow Control Corporation, Denied Request for 7 Day Extension of Discovery Period, 21 Day Continue of Summary Judgement (Jul. 5, 2007).

U.S. District Court, Central District of California, Stipulation and Order to Extend Date to File Pre Trial Documents and Motions in Limine, Judge S. James Otero (Jul. 23, 2007).

U.S. District Court, Central District of California, Order Denying Z&J Motion, (Jul. 24, 2007).

Z&J Technologies Notice of Motion and Motion in Limine to Exclude Testimony (Jul. 24, 2007).

Z&J Points and Authorities in Support of Motion in Limine (Jul. 24, 2007).

Z&J Declaration of Amy C. Christensen in support of Motion in Limine (Jul. 24, 2007).

Curtiss-Wright Flow Control Corporation Motion in Limine to Exclude Evidence Relating to the Pending Reexamination of US Patent No. 6,964,727 (Jul. 24, 2007).

Curtiss-Wright Flow Control Corporation, Declaration of R. Scott Feldmann, (Jul. 24, 2007).

Curtiss-Wright Flow Control Corporation Motion in Limine to Preclude Norgert Marx from Testifying (Jul. 24, 2007).

Curtiss-Wright Flow Control Corporation Motion in Limine to Preclude Evidence or Argument (Jul. 24, 2007).

Curtiss-Wright Flow Control Corporation Declaration of R. Scott Feldmann in Support of Motion in Limine to Preclude Norgert Marx (Jul. 24, 2007).

Z&J Technologies Opposition to Motion in Limine to Preclude Evidence or Argument (Aug. 02, 2007).

Z&J Technologies Declaration of Amy C. Christensen (Aug. 02, 2007).

Z&J Technologies Opposition to Motion in Limine to Exclude Evidence Relating to the Pending Reexamination of US Patent 6,964,727 (Aug. 02/2007).

Z&J Technologies Memorandum in Response to Plaintiff's Motion in Limine (Aug. 02, 2007).

Z&J Technologies Memorandum of Contensions of Fact and Law (Aug. 05, 2007).

Curtiss-Wright Flow Control Corporation, Joint Exhibit (Aug. 06, 2007).

Curtiss-Wright Flow Control Corporation, Joint Witness List (Aug. 10, 2007).

Curtiss-Wright Flow Control Corporation, Pre Trial Exhibit List (Aug. 13, 2007).

Curtiss-Wright Flow Control Corporation Reply and Support Motion in Limine to Exclude Evidence Relating to the Pending Reexamination of US Patent No. 6,964,727 (Aug. 13, 2007).

Curtiss-Wright Flow Control Corporation, Reply and Support of Motion in Limine to Preclude Evidence or Argument (Aug. 13, 2007).

Curtiss-Wright Flow Control Corporation, Reply and Support of Motion in Limine to Preclude Norgert Marx (Aug. 13, 2007).

Z&J Technologies Reply and Support of Motion in Limine (Aug. 13, 2007).

Z&J Technologies Declaration of Amy C. Christensen (Aug. 13, 2007).

Curtiss-Wright Flow Control Corporation, Deposition Designations (Aug. 13, 2007).

Z&J Technologies Application for Order to Bring Equipment Into Courtroom for Trial (Aug. 16, 2007).

US District Court Central District of California, Minutes (Aug. 17 2007).

US District Court Central District of California, Order (Aug. 17 2007).

US District Court Central District of California, Stipulation and Order, Dismissal with Prejudice (Aug. 21, 2007).

U.S. Appl. No. 10/731,874, Non-Final Rejection issued Feb. 23, 2005 by the United States Patent and Trademark Office. Examiner Alexa A. Doroshenk, pp. 1-10.

U.S. Appl. No. 10/731,874, Final Rejection issued Jun. 28, 2005 by the United States Patent and Trademark Office. Examiner Alexia A. Doroshenk, pp. 1-7.

U.S. Appl. No. 10/731,874, Examiner's search and stretegy results issued Sep. 26, 2005 by Examiner Alexa A. Dorshenk. 1 page.

U.S. Appl. No. 10/731,874, Notice of Allowance of Fees Due, Issue Information, Index of Claims and Search Information issued Sep. 29, 2005 by the United States Patent and Trademark Office; Examiner Alexa A. Doroshenk. 7 pages..

U.S. Appl. No. 10/731,874, Notice of Allowance of Fees Dues, List of References, Issue Information, Search information and index of claims issued Jan. 18, 2006 by the United States Patent and Trademark Office; Examiner Alexa D. Neckel. 10 pages.

U.S. Appl. No. 10/731,874, Non-Final Rejection issued Oct. 13, 2006 by the United States Patent and Trademark Office; Examiner Alexa D Neckel. 22 pages.

U.S. Appl. No. 10/731,874, Non-Final Rejection issued Apr. 6, 2007 by the United States Patent and Trademark Office; Examiner Jennifer A. Leung, 14 pages.

U.S. Appl. No. 10/731,874, Requirement for Restriction/Election, List of References and index of claims issued Sep. 06, 2007 by the United States Patent and Trademark Office; Examiner Jennifer A. Leung, 20 pages.

U.S. Appl. No. 10/731,874, Examiner's search straegy and results issued Dec. 05, 2007 by Examiner Jennifer A. Leung, 1 page.

U.S. Appl. No. 10/731,874, Non-Final Rejection issued Dec. 11, 2007 by the United States Patent and Trademark Office; Examiner Jennifer A. Leung, 22 pages.

U.S. Appl. No. 10/997,834, Examiner's search strategy and results issued Jun. 22, 2005; Examiner Alexa A. Doroshenk, 5 pages.

U.S. Appl. No. 10/997,834, Non-Final Rejection issued Jul. 06, 2005 by the United States Patent and Trademark Office; Examiner Alexa A. Doroshenk, 44 pages.

U.S. Appl. No. 10/997,834, Examiner's search strategy and results issued Sep. 26, 2005; Examiner Alexa A. Doroshenk, 1 pages.

U.S. Appl. No. 10/997,834, Notice of Allowance and Fees, Issue Information, Index of Claims and search information issued Sep. 29, 2005 by the United States Patent and Trademark Office; Examiner Alexa D. Neckel, 8 pages.

U.S. Appl. No. 10/411,849, Examiner's search strategy and results issued Aug. 04, 2005; Examiner Nina Nmn Bhat, 5 pages.

U.S. Appl. No. 10/411,849, Non-Final Rejection issued Aug. 09, 2005 by the United States Patent and Trademark Office; Examiner Nina Nmn Bhat, 8 pages.

U.S. Appl. No. 10/411,849, Non-Final Rejection issued Feb. 08, 2006 by the United States Patent and Trademark Office; Examiner Nina Nmn Bhat, 7 pages.

U.S. Appl. No. 10/411,849, Examiner's search strategy and results issued Jul. 18, 2006 Examiner Nina Nmn Bhat, 1 pages.

U.S. Appl. No. 10/411,849, Notice of Allowance and Fees Due, Examiner Interview Summary Record, Issue Information, Index of Claims, Search Information and Bibliographic Data sheet issued Jul. 24, 2006 by the United States Patent and Trademark Office; Examiner Nina Nmn Bhat, 14 pages.

U.S. Appl. No. 10/997,234, Examiner's search strategy and results issued Mar. 14, 2006; Examiner Daniel P. Stephenson, 3 pages.

U.S. Appl. No. 10/997,234, Non-Final Rejection issued Mar. 20, 2006 by the United States Patent and Trademark Office, Examiner Daniel P. Stephenson, 13 pages.

U.S. Appl. No. 10/997,234, Examiner's search strategy and results issued Aug. 4, 2006; Examiner Daniel P. Stephenson, 1 pages.

U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, Examiner Daniel P. Stephenson, 8 pages.

U.S. Appl. No. 10/412,628, Non-Final Rejection issued Feb. 16, 2007 by the United States Patent and Trademark Office; Examiner Nina Nmn Bhat, 17 pages.

U.S. Appl. No. 10/412,628, Notice of Allowance and Fees Due, Bibliographic Data Sheet, Index of Claims, Search Information and Issue Information issued Aug. 24, 2007 by the United States Patent and Trademark Office; Examiner Nina Nmn Bhat, 11 pages.

U.S. Appl. No. 10/873,022, Non-Final Rejection issued Jul. 07, 2007 by the United States Patent and Trademark Office; Examiner Alexis A. Wachtel, 12 pages.

U.S. Appl. No. 10/873,022, Notice of Allowance and Fees Due, Specification and Issue Information issued Jan. 04, 2006 by the United States Patent andTrademark Office, Examiner Alexis A. Wachtel, 9 pages.

U.S. Appl. No. 10/274,280, Examiner's search strategy and results issued Mar. 14, 2004; Examiner Alexis a. Wachtel, 2 pages.

U.S. Appl. No. 10/274,280, Non-Final Rejection issued Mar. 25, 2004 by the United States Patent and Trademark Office; Examiner Alexis A. Wachtel, 10 pages.

U.S. Appl. No. 10/274,280, Notice of Allowance and Fees Due, Issue Information and Bibliographic Data Sheet issued Oct. 05, 2004 by the United States Patent and Trademark Office; Examiner Alexis A. Wachtel, 8 pages.

U.S. Appl. No. 10/442,673, Examiner's search strategy and results issued Aug. 26, 2004, Examiner Alexa A. Doroshenk, 2 pages.

U.S. Appl. No. 10/442,673, Non-Final Rejection issued Sep. 01, 2004 by the United States Patent and Trademark Office; Examiner Alexa A. Doroshenk; 10 pages.

U.S. Appl. No. 10/442,673, Final Rejection issued Feb. 23, 2005 by the United States Patent and Trademark Office; Examiner Alexa A. Doroshenk; 6 pages.

U.S. Appl. No. 10/442,673, Notice of Allowance and Fees Due, Amendment After Final, Issue Information, Index of Claims and Search Information issued Apr. 20, 2005 by the United States Patent and Trademark Office; Examiner Alexa A. Doroshenk; 10 pages.

Curtiss-Wright Flow Control Corp., Complaint, Court Pleading, Dec. 16, 2004.

Velan, Inc., Answer, Affirmative Defenses and Counterclaims, Court Pleading, Jan. 10, 2005.

Curtiss-Wright Flow Control Corp., Answer to Defendant Velan Inc.'s Counterclaims, Court Pleading, Feb. 2, 2005.

Curtiss-Wright Flow Control Corp., Motion for a Preliminary Injunction, Court Pleading, Mar. 1, 2005.

Transcript, Deposition of Ruben F. Lah, Transcript, Mar. 29, 2005.

Exhibits, Exhibits from Mar. 29, 2005 Deposition of Ruben F. Lah, Exhibits, Mar. 29, 2005.

Velan, Inc., Opposition to Curtiss-Wright Flow Control Corp.'s Motion for a Preliminary Injunction, Court Pleading Apr. 1, 2005.

Curtiss-Wright Flow Control Corp., Reply Brief in Support of Its Motion for Preliminary Injunction, Court Pleading, Apr. 8, 2005.

U.S. District Court for the Western District of Texas, Preliminary Injunction Hearing Transcript, Transcript, Apr. 12, 2005.

Velan, Inc., Supplement to Velan Inc.'s Opposition ot Curtiss-Wright Flow Control Corp.'s Motion for a Preliminary Injunction, Court Pleading, Apr. 12, 2005.

U.S. District Court for the Western District of Texas, Order RE Motion for Preliminary Injunction, Order, Apr. 15, 2005.

Velan, Inc., Motion to Stay Discovery and Proceedings Pending Appeal, Court Pleading, Apr. 29, 2005.

Curtiss-Wright Flow Control Corp.,Opposition to Motion to Stay Discovery and Proceedings Pending Appeal, Court Pleading, May 9, 2005.

Velan, Inc., Appeal of the Order of the Magistrate Judge Denying Velan's Motion to Stay Discovery and Proceedings Pending Appeal, court Pleading, Jun. 2, 2005.

Velan, Inc. Brief of Defendant-Appellant Velan, Inc., Court Pleading, Jun. 2, 2005.

Curtiss-Wright Flow Control Corp., Opposition to Velan Inc.'s Appeal of the Order of the Magistrate Judge Denying Velan's Motion to Stay Discovery. . ., Court Pleading, Jun. 7, 2005.

Curtiss-Wright Flow Control Corp., [Corrected] Brief of Plaintiff-Appellee Curtiss-Wright Flwo Control Corp., Court Pleading, Jul. 13, 2005.

Velan, Inc., Reply Brief of Defendant-Appellant Velan, Inc., Court Pleading, Jul. 15, 2005.

Curtiss-Wright Flow Control Corp. & Velan, Inc., Joint Appendix on Appeal to the Federal Circuit, Court Pleading, Jul. 19, 2005.

Curtiss-Wright Flow Control Corp. & Velan, Inc., Joint Claim Construction and Prehearing Statement, Court Pleading, Aug. 10, 2005.

Curtiss-Wright Flow Control Corp., Memorandum on Claim Construction Issues, Court Pleading, Sep. 2, 2005.

Velan, Inc., Brief on Claim Construction Issues, Court Pleading, Oct. 3, 2005.

Curtiss-Wright Flow Control Corp., Reply Memorandum on Claim Construction Issues, Court Pleading, Oct. 18, 2005.
Curtiss-Wright Flow Control Corp., First Amended Complaint, Court Pleading, Dec. 7, 2005.
Velan, Inc., Answer, Affirmative Defenses and Counterclaims to Curtiss-Wright Flow Control Corp.'s First Amended complaint, Court Pleading, Dec. 27, 2005.
Curtiss-Wright flow Control Corp., Answer to Velan's Counterclaim to the First Amended Complaint, Court Pleading, Dec. 30, 2005.
Curtiss-Wright Flow Control Corp. & Velan, Inc., Amended Joint Claim Construction Statement, Court Pleading,Jan. 12, 2006.
Transcript, Transcript of Claim Construction Hearing Before U.S. Magistrate Judege John W. Primomo RE Claim Construction, Transcript, Jan. 17, 2006.
U.S. Court of Appeals for the Federal Circuit, Decision on Appeal of thePreliminary Injuction Order of Apr. 15, 2005, Decision on Appeal, Feb. 15, 2006.
Curtiss-Wright Flow Control Corp., Renewed Motion for a Preliminary Injuction, Court Pleading, Feb. 21, 2006.
Velan, Inc., Opposition ot Curtiss-Wright'sRenewed Motion for a Preliminary Injunction, Court Pleading, Mar. 10, 2006.
Velan, Inc., Supplemental Brief on Claim Construction Addressing the Impact of the Federal Circuit Opinion, Court Pleading, Mar. 15, 2006.
Velan, Inc., Motion for Partial Summary Judgement of Non-Infringement of U.S. Patent Nos. 6,565,714 and 6,660, 131, Court Pleading, Mar. 15, 2006.
Curtiss-Wright Flow Control Corp., Brief on the Impact of the Federal Circuit's Feb. 15, 2006 Decision, Court Pleading, Mar. 16, 2006.
Curtiss-Wright Flow Control Corp., Reply Brief in Support of Curtiss-Wright's Renewed Motion for a Preliminary Injunction, Court Pleading, Mar. 21, 2006.
Curtiss-Wright Flow Control Corp., Opposition to Velan's Motion for Partial Summary Judgement of Non-Infringement, Court Pleading, Mar. 28, 2006.
Curtiss-Wright Flow Control Corp. Cross-Motion for Partial Summary Judgement of Infringement, Court Pleading, Apr. 10, 2006.
Velan, Inc. Federal Rule 56(f) Opposition to Curtiss-Wright's Motion for Partial Summary Judgement of Infringement, Court Pleading, Apr. 10, 2006.
Velan, Inc. Reply in Support of Its Motion for Partial Summary Judgement of Non-Infringement of U.S. Patent Nos. 6,565,714 and 6,660,131, Court Pleading, Apr. 10, 2006.
Curtiss-Wright Flow Control Corp., Reply in Support of its Cross-Motion for Partial Summary Judgement of Infringement, Court Pleading, Apr. 24, 2006.
Transcript, Deposition of Michael F. Krieger, Transcript, May 18, 2006.
Exhibits, Exhibits from May 18, 2006 Deposition of Michael F. Krieger, Exhibits, May 18, 2006.
Transcript, Deposition of Ruben F. Lah, Transcript, May 19, 2006.
Exhibits, Exhibits from May 19, 2006 Deposition of Ruben F. Lah, Exhibits, May 19, 2006.
Velan, Inc., Sur-Reply to Curtiss-Wright's Renewed Motion for a Preliminary Injunction, Court Pleading, Jun. 13, 2006.
U.S. District Court for the Western District of Texas, Memorandum and Recommendation RE Claim Construction, Order Jun. 19, 2006.
U.S. District Court for the Western District of Texas, Clarification Order RE Claim Construction, Order, Jun. 23, 2006.
Velan, Inc. Objections to the Magistrate Judge's Memorandum and Recommendation on Claim Construction and Clarification Order, Court Pleading, Jul. 3, 2006.
Curtiss-Wright Flow Control Corp., Ojbections to Memorandum and Recommendation on Claim Construction Issues, Court Pleading, Jul. 3, 2006.
Velan, Inc., Response to Curtiss-Wright's Objections to Memorandum and Recommendation on Claim Construction Issues, Court Pleading, Jul. 18, 2006.
Curtis-Wright Flow Control Corp., Response to Velan, Inc.'s Objections to the Magistrate Judge's Memorandum and Recommendation on Claim. . ., Court Pleading, Jul. 18, 2006.
U.S. District Court for the Western District of Texas, Memorandum and Recommendation RE Renewed Motion for Preliminary Injunction, Order, Aug. 10, 2006.
U.S. District Court for the Western District of Texas, Memorandum and Recommendation RE Motion for Partial Summary Judgement of Non-Infringement, Order, Aug. 10, 2006.
U.S. District Court for the Western District of Texas, Memorandum and Recommendation RE Motion for Partial Summary Judgement of Non-Infringement, Order, Aug. 10, 2006.
U.S. District Court for the Western District of Texas, Stipulation and Order of Dismissal, Order, Aug. 16, 2006.
Z&J Technologies GmbH, Innovative Z&J Coker Isolation and Deheading Valves, PowerPoint Presentation, Mar. 31, 2004.
Curtiss-Wright Flow Control Corp., Complaint for Patent Infringement, Court Pleading, Apr. 19, 2006.
Zimmermann & Jansen, Inc., Answer to Complaint, Court Pleading, Jun. 9, 2006.
Curtiss-Wright Flow Control Corp., Motion for Preliminary Injunction, Court Pleading, Jun. 12, 2006.
Transcript, Deposition of Michael F. Krieger, Transcript, Jun. 20, 2006.
Exhibits, Exhibits from Jun. 20, 2006 Deposition of Michael F. Krieger, Exhibits, Jun. 20, 2006.
Transcript, Deposition of Ruben F. Lah, Transcript, Jun. 21, 2006.
Exhibits, Exhibits from Jun. 21, 2006 Deposition of Ruben F. Lah, Exhibits, Jun. 21, 2006.
Z&J Technologies GmbH, Answer to Complaint, Court Pleading, Jul. 19, 2006.
Z&J Technologies GmbH & Zimmermann & Jansen, Inc., Memorandum in Opposition to Plaintiff's Motion for Preliminary Injunction, Court Pleading, Jul. 20, 2006.
Curtiss-Wright Flow Control Corp., Reply Brief in Support of Motion for Preliminary Injunction, Court Pleading, Aug. 4, 2006.
Zimmermann & Jansen, Through Conduit Type Valve Single Disc Design: Metal-to-Metal Seating, Brochure, Undated.
Zimmermann & Jansen, Through Conduit Type Valve Double Disc Design: Metal-to-Metal Seating, Brochure, Undated.

* cited by examiner

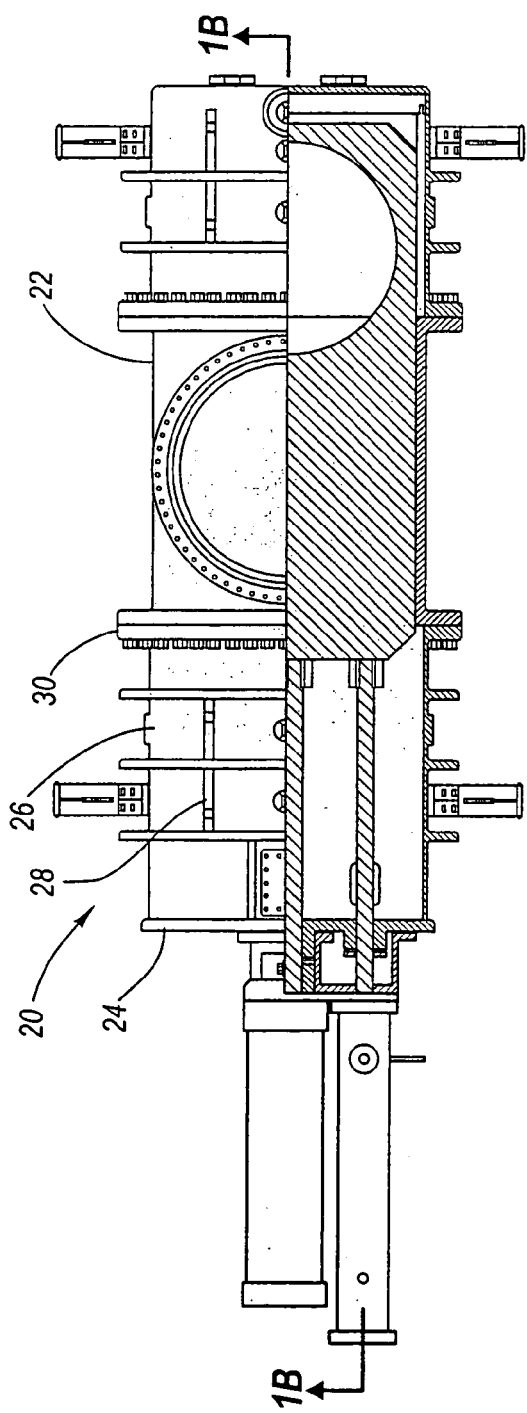
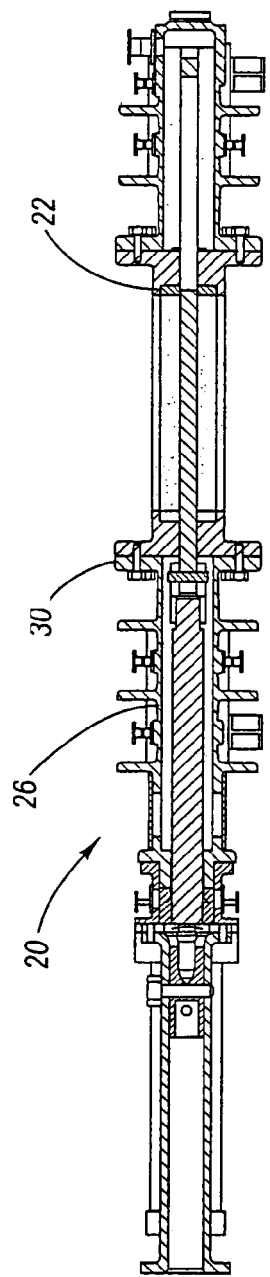
Fig. 1A
Fig. 1B

COKE DRUM BOTTOM THROTTLING VALVE AND SYSTEM

RELATED APPLICATIONS

This application claims priority to U.S. Provisional Patent Application Ser. No. 10/873,022 filed Nov. 1, 2004, entitled, "Coke Drum Bottle Throttling Valve and System," which claims priority to U.S. patent application Ser. No. 10/274,280, filed Oct. 18, 2002 now U.S. Pat. No. 6,843,889 entitled, "Coke Drum Bottom Throttling Valve and Systems," which claims priority to Provisional Patent Application Ser. No. 60/408,537, filed Sep. 5, 2002.

BACKGROUND

1. Field of the Invention

The present invention relates to a device and system for use with a de-heading vessel containing a fluid, distillates, or an unconsolidated debris byproduct, such as the several types of coke. Specifically, the present invention relates to a system and device, namely a shroud for use with a de-header valve and that is coupled to a coke drum which serves to safely and effectively de-head the coke drum following the formation of coke, or other byproducts, to facilitate the removal of coke during the coking process.

2. Background

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

When one coke drum is full, it must be purged of the byproduct fed into it. The drum is steam purged and cooled with quench water. The drum is then drained of water and vented to atmospheric pressure, after which the top and bottom heads are removed (i.e. the coke drum is de-headed) to allow the coke to be cut from the drum and fall into a catch basin, typically a rail car. This process of de-heading the coke drum can be extremely dangerous for several reasons. To mention only a few, the cooling water introduced into the hot drums prior to the removal of the bottom head becomes extremely hot and could leak from the loosened head and scald surrounding operators, the load of un-drained water and loose coke within the drum may exceed the limits of the support system and cause it to fail. Positioning the chute and necessary removal of the flanges or heads is done with operators who are in close proximity to the drums, potentially falling coke may injure workers as the heads are removed, and operating personnel may be exposed to finely divided coke particles, steam, hot water and noxious gases, when the drum is opened. Indeed several fatalities occur each year as a result of this manufacturing process. Once the coke is removed, the heads are replaced and the coke drum is prepared to repeat the cycle.

Prior art systems and methods have tried too more efficiently and effectively de-head coke drums, as well as to minimize many of the dangers inherent in the de-heading process. One such method involves placing a de-heading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away. This is extremely dangerous due to the manual labor requirements.

Other systems have been disclosed, which somewhat reduce human or manual involvement. For example, U.S. Pat. No. 4,726,109 to Malsbury et al. and U.S. Pat. No. 4,960,358 to DiGiacomo et al. describe a remote unheading device for coking drums. The device includes a head unit for attachment to a lower flange of a coking drum and a plurality of swing bolts which are disconnected by remotely operated de-tensioning equipment. A platform device lowers the head unit, moves it laterally to one side and tips it for cleaning. A chute attached to the frame can be raised into engagement with the coking drum lower flange for removal of coke from the drum.

U.S. Pat. No. 5,098,524 to Antalfy et al. filed on Dec. 10, 1990 discloses a coke drum unheading device having a pivoting actuator system operable from a location remote from a drum outlet. The actuator is adapted to move a drum head between closed and open positions and to retain the drum head in a closed position under a load.

U.S. Pat. No. 5,500,094 to Fruchtbaum provides a coke drum unheading device that retracts and tilts the bottom head incrementally so that falling debris such as shot coke can be caught by a chute. Following disposal of the loose debris, the head can be withdrawn from the area of the drum for maintenance. Specifically, the invention provides an unheading device for removing a bottom head from a flange on a lower end of a coke drum. An unheading car is horizontally movable into and from position below the bottom head. A vertically adjustable bottom head support member is mounted on the car. A bearing plate is pivotally mounted at an upper end of the support member for engaging a lower surface of the bottom head. A retractable arm has first and second sections hingedly connected at one end and having respective opposite ends secured to the bearing plate and the support member for pivoting the bearing plate and bottom head supported thereon with respect to horizontal, preferably to tilt the head towards an adjacent chute.

U.S. Pat. No. 5,581,864 to Rabet discloses an apparatus and method enabling removal of the drum head of a coke drum, which comprises an apparatus remotely placing a carriage under the drum head and the carriage is adapted to remotely engage the drum head, tightly support the head against the drum while workers are in the area, and to lower the head and carry it away. A safety feature is also included and disclosed, wherein the carriage is normally supported by springs which, in the event of excessive loads, automatically transfers the load carrier to an overhead beam designed to carry any excessive loads.

Each of these prior art devices share common deficiencies in that they are incapable of providing simple, efficient, and safe solutions to the de-heading of a coke drum. Specifically, each of the assemblies or devices require that the head unit be completely removed from the flange portion of the coke drum after each coking cycle and prior to the purging of the coke from the coke drum. This creates an extreme hazard to workers and provides an inefficient and time consuming procedure. Removal of the head unit increases the chance for accident, while at the same time increases human involvement as the head unit must be properly placed on the coke drum each time despite the automation involved. In addition, a large amount of floor space is required to accommodate those assemblies and devices that automate the removal and lifting of the head unit from the coke drum. Finally, such devices and systems may not be operable in an environment where there the bottom headroom is less than the diameter of the bottom head.

SUMMARY

A typical de-header system comprises a dual seated, linear motion goggle blind gate valve, or de-header valve, that is removably coupled to and seals against the flanged portion of a coke drum much the same way a conventional head unit would be attached. The de-header valve is equipped with a sliding blind having an orifice therein, a flat surface adjacent the orifice, a stroke slightly greater than the diameter of the orifice in the de-header valve, and upper and lower seats, wherein one of such seats is a dynamic, live loaded seat that is capable of automatic adjustment so as to seal the blind between the upper seat. As such, the sliding blind can be moved in a substantially linear bi-directional manner between upper and lower seats, or dual seats, thus causing the orifice located thereon to move between an open, closed, and partially open position relative to the orifice in the coke drum. In a closed position, the de-header valve and coke drum are prepared to receive the byproduct feed from the refinery process used to manufacture coke. Once the drum is full, the valve may be actuated causing the sliding blind to open. In doing so, coke that has accumulated on the blind is sheared by the upper and lower seats, thus de-heading the coke drum and facilitating the removal of coke using methods commonly known in the art.

The present invention operates in an environment wherein a coke drum de-heading system may comprise (a) at least one coke drum containing manufactured coke therein, wherein the coke drum has a top orifice and a bottom orifice; (b) a de-header valve removably coupled to the coke drum and designed to facilitate the removal of coke from the coke drum by de-heading the coke drum and allowing the coke to pass there through; and (c) an exchange system, including an upper and lower bonnet and other elements and members adapted to integrate the de-heading system, and particularly the de-header valve, into the manufacturing system. The de-header valve itself may comprise (1) a main body having an orifice dimensioned to align, in a concentric relationship, with either the top or bottom orifice of the coke drum when the de-header valve is coupled thereto; (2) a live loaded seat assembly coupled to the main body and comprising a floating dynamic, live loaded seat, a live seat adjustment mechanism coupled to the main body and designed to control and adjust the force and resulting seat load of the dynamic, live loaded seat, and a force transfer module in juxtaposition to the dynamic, live loaded seat for transferring the force from the live loaded seat adjustment mechanism to the dynamic, live loaded seat; (3) a static seat positioned opposite from and counteracting or counterbalancing the dynamic, live loaded seat; and (4) a blind or sliding blind capable moving in a linear, bi-directional manner within the de-header valve and between the dynamic, live loaded seat and the static seat, the blind physically controlled by an actuator and having a force exerted thereon by the dual seats, namely the dynamic, live loaded seat and the static seat, such that a seal is created between the dynamic, live loaded seat, the blind, and the static seat. In essence, the de-header valve de-heads the coke drum and facilitates the removal of the coke from the coke drum upon actuation of the blind from a closed to an open position.

As the blind is actuated from a closed position, opening of the blind exposes the drum to the outside atmosphere. As can be seen in FIGS. 1A and 1B, this causes depressurization of any residual pressure in the drum and allows coke and any liquid contained within the drum to fall down the material discharge chute. By varying the speed of the actuation of the valve, the flow of this material may be regulated or throttled so as to prevent surges of material from flowing down the chute and overwhelming the coke receiving area or any equipment below. In addition to the residual pressure in the drum, steam can also be released around the blind if not properly prevented. For example, in order to prevent outflow of material from the drum, the valve is body pressurized with a 20-PSI gradient above the pressure within in the drum. Upon actuation of the blind, there remains a 20-PSI steam pressure within the valve body.

The inventive shroud and side valve seals significantly reduce the amount of steam released through the open blind when the valve is throttling. Upon complete closing of the blind, the shroud cap end plate is engaged overcoming a biasing pressure on shroud cap return springs and releasing steam pressure from the valve body into the shroud. Upon stroking of the valve in the opposite direction to open the the blind, the shroud cap return springs bias the cap closed on the end of the shroud to prevent any further migration of steam pressure from the body cavity into the shroud. The benefits of the shrouding closure and valve side gate seals is that the amount of steam lost from the system during the throttling is greatly reduced and the shroud prevents dropping of any coke which accompanies the movement of the opening of the blind valve from falling into the bonnet. This is especially important in a throttling situation where the inner diameter of the opening of the blind will communicate with the interior of the shroud for extended periods of time thus having a greater opportunity to retain coke fragments. The openings in the gate valve also have an opportunity to fill. Without the shroud, this material would be deposited in the bonnet upon actuation of the valve. Instead, because of the close tolerance between the shroud and the blind, any deposited materials will accompany the blind as it is actuated and be pushed out through the downstream port of the valve as the valve is closed.

BRIEF DESCRIPTION OF THE DRAWINGS

FIG. 1 is a cutaway view of the entire valve body demonstrating the interaction between the blind orifice and the valve body in the closed position (bonnets removed for clarity);

DETAILED DESCRIPTION OF THE PREFERRED EMBODIMENTS

Figure 2:
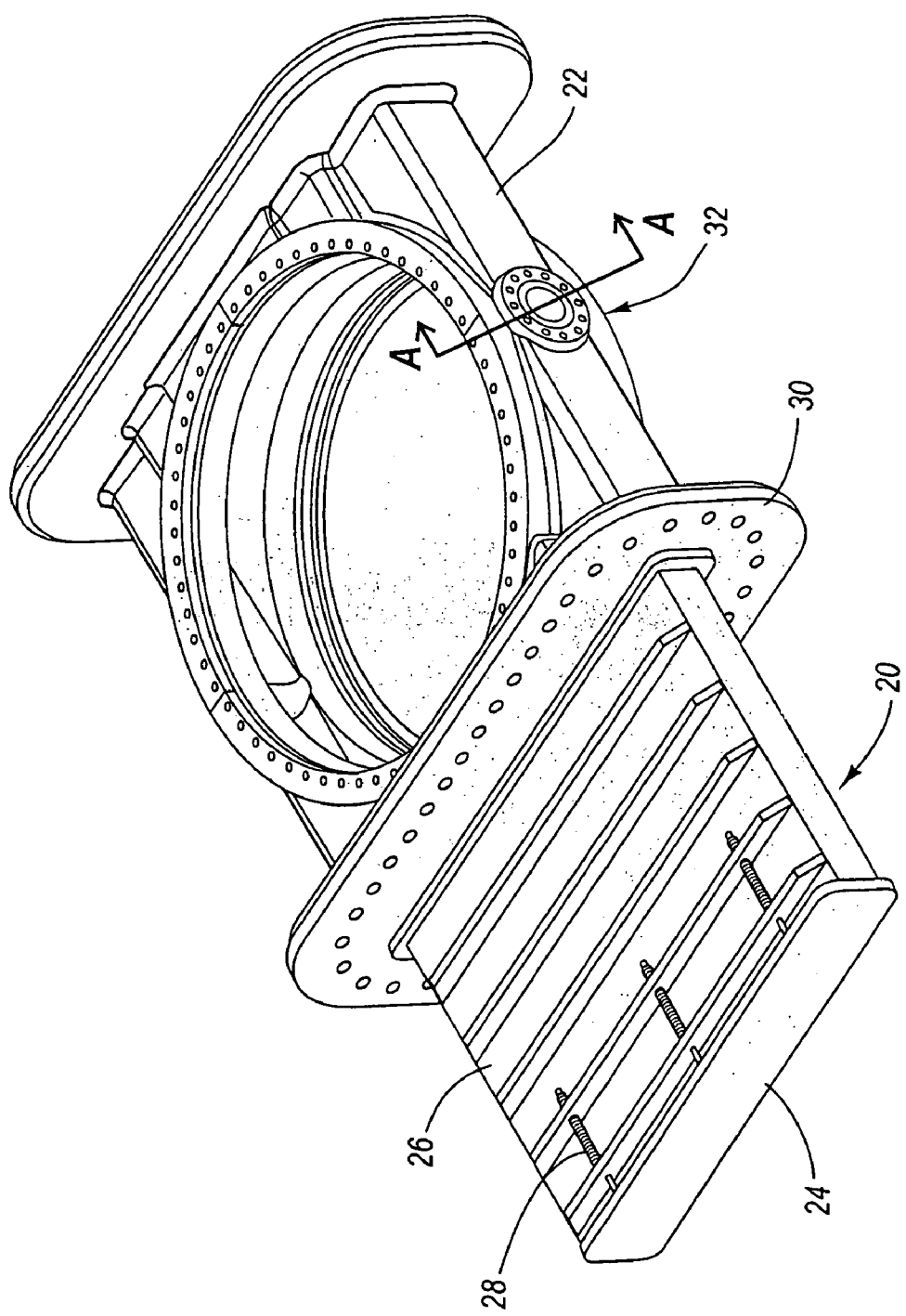
FIG. 2 is a perspective view of the valve body and shroud.

It will be readily understood that the components of the present invention, as generally described and illustrated in the figures herein, could be arranged and designed in a wide variety of different configurations. Thus, the following more detailed description of the embodiments of the system, device, and method of the present invention, as represented in FIGS. 1A-4, is not intended to limit the scope of the invention, as claimed, but is merely representative of the presently preferred embodiments of the invention.

The presently preferred embodiments of the invention will be best understood by reference to the drawings wherein like parts are designated by like numerals throughout. Although reference to the drawings and a corresponding discussion follow below, it is first advantageous to provide a general background of the coking process, including the process of de-heading the coke drums at the end of a manufacturing cycle.

General Discussion on Delayed Coking and Coke De-Heading

In the typical delayed coking process, high boiling petroleum residues are fed to one or more coke drums where they are thermally cracked into light products and a solid residue—petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,000° F. With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25-30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke, and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. The delayed coking process is a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. This is a timely process, with each batch in the batch-continuous process taking approximately 12-20 hours to complete. In essence, hot oil, or residue as it is commonly known, from the tube furnace is fed into one of the coke drums in the system. The oil is extremely hot (95° F.) and produces hot vapors that condense on the colder walls of the coke drum. As the drum is being filled, a large amount of liquid runs down the sides of the drum into a boiling turbulent pool at the bottom. As this process continues, the hot residue and the condensing vapors cause the coke drum walls to heat. This naturally in turn, causes the residue to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again in the manufacture of coke.

The decoking process is the process used to remove the coke from the drum upon completion of the coking process. Due to the shape of the coke drum, coke accumulates in the area near and attaches to the heads during the manufacturing process. To decoke the drum, the heads must first be removed. Typically, once full, the drum's contents are stripped and water quenched down to a temperature of 200° F. or less and vented to atmospheric pressure and the top head (typically a 4-foot diameter flange) is unbolted and removed to enable placement of a hydraulic coke cutting apparatus. After the cooling water is drained from the vessel, the bottom head (typically a 6-foot-diameter blind plate quench) is unbolted and removed. This process is commonly known as "de-heading" and can be a very dangerous procedure because of the size of the heads, the high temperatures within the drum, potential falling coke, and other reasons as mentioned above. Once the heads are removed, the coke is removed from the drum by drilling a pilot hole from top to bottom of the coke bed using high pressure water jets. Following this, the main body of coke left in the coke drum is cut into fragments which fall out the bottom and into a coke receiving area, and in some cases into, a bin or a rail cart, etc. The coke is then dewatered, crushed and sent to coke storage or loading facilities.

Present Invention Coke Drum De-Heading System

Although the present invention is applicable and utilized on both the top and bottom openings of a coke drum, the following detailed description and preferred embodiments will be discussed in reference to a bottom de-heading system only. One of ordinary skill in the art will recognize that the invention as explained and described herein for a coke drum bottom de-heading system may also be designed and used as a coke drum top or side de-heading system and the following discussion pertaining to the bottom de-heading system is not meant to be limiting to such.

The present invention is used in conjunction with a device for de-heading a coke drum following the manufacture of coke therein. As the present invention is especially adapted to be used in the coking process, the following discussion will relate specifically in this manufacturing area. It is foreseeable however, that the present invention may be adapted to be an integral part of other manufacturing processes producing various elements other than coke, and such processes should thus be considered within the scope of this application.

The present invention comprises a shroud and gate seal assembly. The inventive shroud and gate seal assembly may be used in conjunction with a dual seated, linear motion, goggle blind valve or other types of de-heading gate valves. FIGS. 1A and 1B depict the environment in which a typical de-heading gate valve is employed. As can be seen in more detail in FIG. 2, a shroud 20 is shown attached to a valve body 22. The shroud has a shroud cap 24, shroud body 26 and springs 28 which bias the shroud cap 24 against shroud body 26. Upon actuation of the valve, a blind is moved from an open position as shown in FIG. 2 and as the blind travels from the open position, it contacts shroud end cap 24 and releases steam pressure built up within shroud body 26. Upon actuation of the blind in the opening direction, the blind will move away from contact with shroud cap 24 allowing spring 28 to bias cap 24 against shroud body 26 thereby sealing the shroud and preventing the escape of steam. Shroud 20 is attached to valve body 22 by a flange 30. It is important that the shroud be aligned with the valve body 22 to allow proper passage of the blind as it is actuated. The tolerances and clearances between the blind and the shroud body are important. Any residual coke that follows the blind into the shroud must either remain within the blind or must be held within the shroud so that it does not fall into the lower bonnet of the valve. Any coke particulate held within the shroud will be acted upon by the steam and much of it will be ejected from the shroud cap as it is encountered by the end of the blind as it is actuated.

Figure 3:
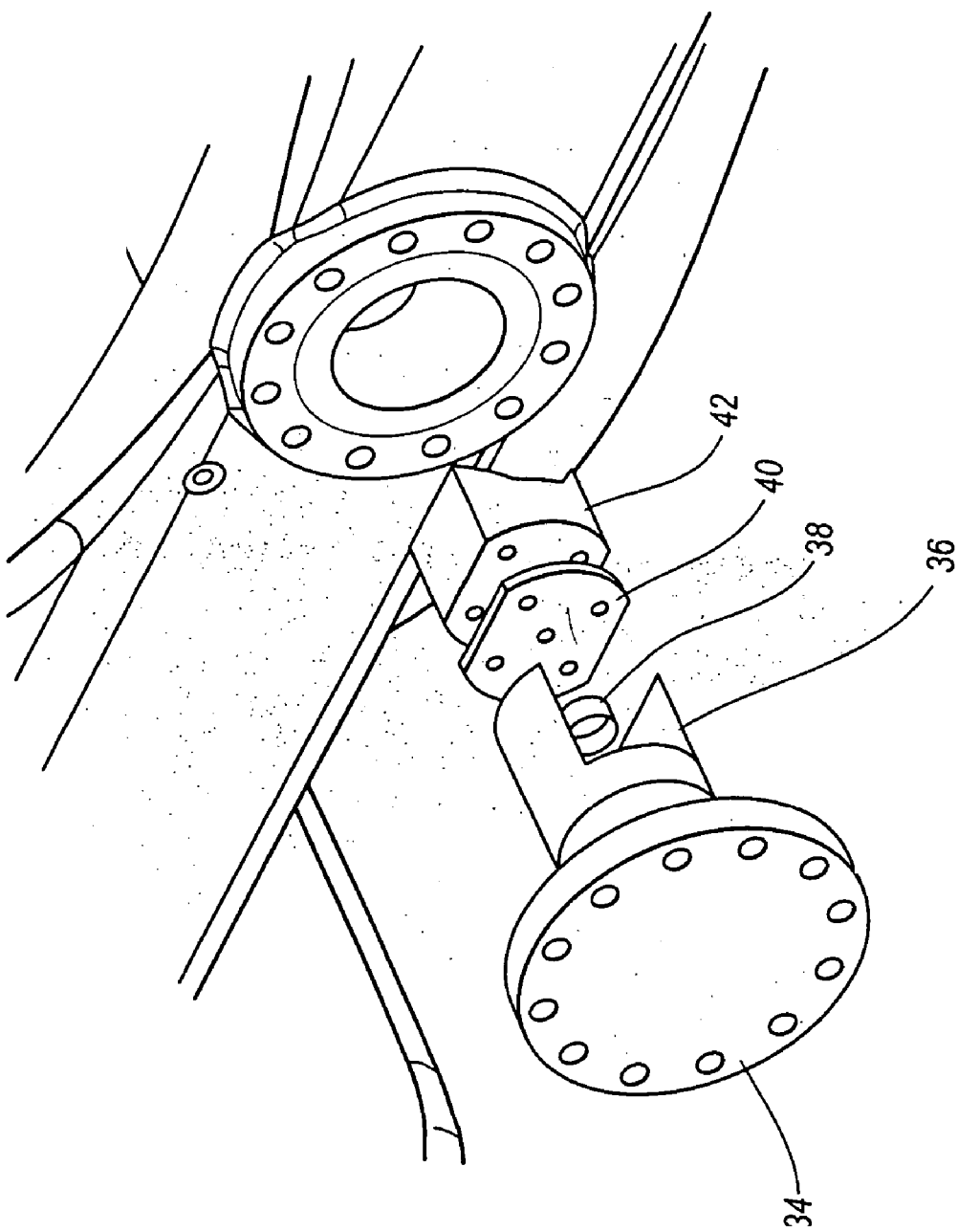
FIG. 3 is a an exploded view of the gate seal assembly.

Turning now to another portion of the inventive system, a gate seal assembly 32 is shown located within valve body 22 in FIG. 2. FIG. 3 depicts an exploded view of the contents of the assembly which comprises a seal cap 34, a guide cup 36, a load spring 38, and seal plate 40, and a gate seal 42. Seal cap 40 is used to hold the contents inside valve body 22. Guide cups 36 serves to guide the movement of gate seal 42 which floats freely therein and operates against the sides of the blind. Because the seal between gate seal 42 and the side of the blind is not perfect, load spring 48 provides pressure against guide seal 42 to insure a fit which will prevent the flow, or at least reduce the flow of steam there through. Since valve body 22 has internal components which are under a constant positive pressure to prevent the flow of contaminates from the drum into the valve body, actuation of the blind allows pressure to flow out of the pressurized body cavity through the up stream and downstream ports of the valve. This pressure loss can result in a negative pressure boundary flowing from the drum into the body cavity. Gate seal 42 prevents the escape of this steam or at least reduces it to the point where the escape is minimal. Thus the body cavity retains a positive pressure over that of the drum.

Figure 4:
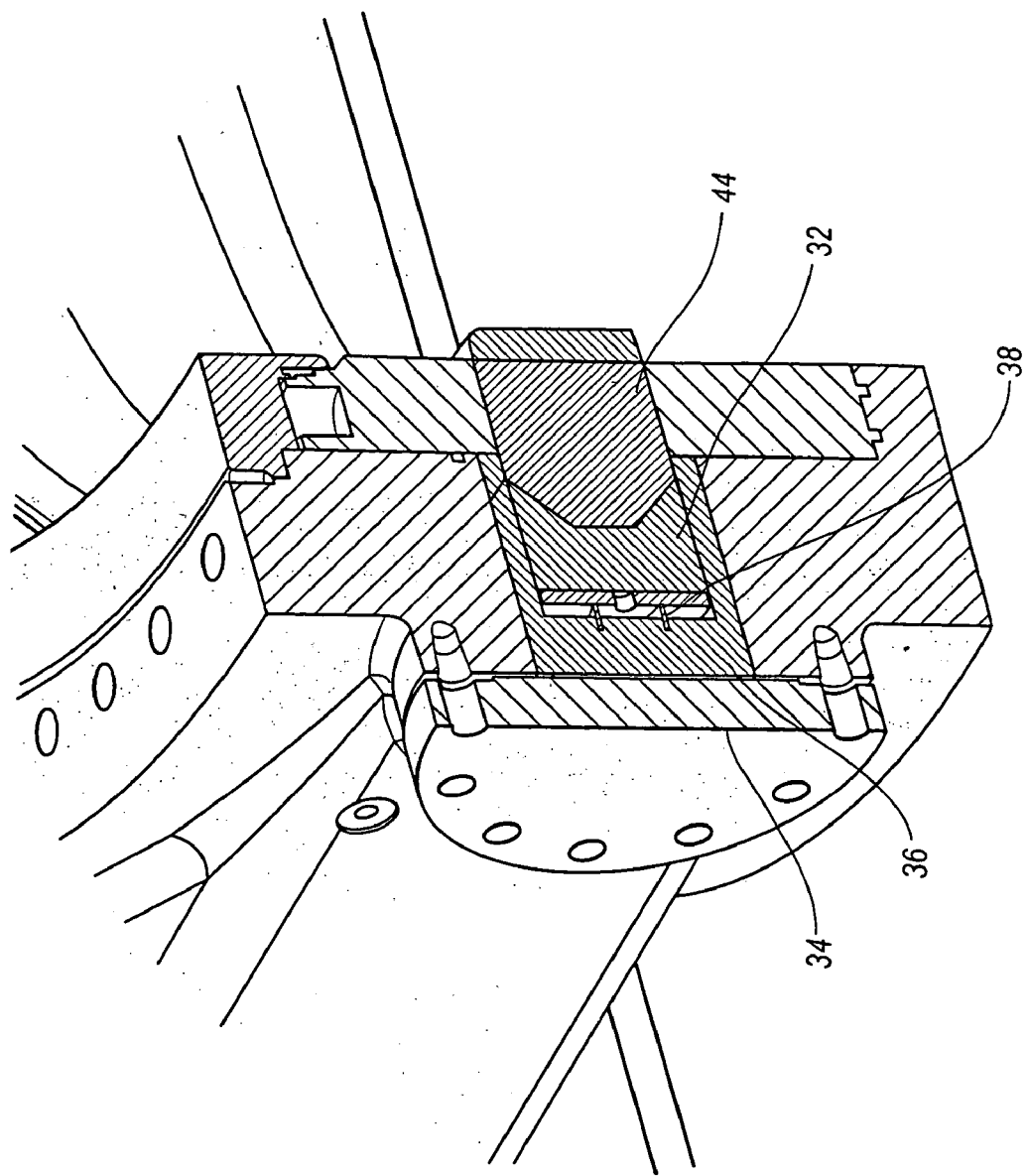
FIG. 4 is a cross-sectional view taken through the gate seal of FIGS. 2 and 3 demonstrating the interaction between the internal components.

Turning now to FIG. 4, a cross-sectional view taken along lines AA and FIG. 2 is depicted. The interaction between gate seal 22 and gate 44 is depicted. Gate seal assembly 32 remains statically in place as gate 44 moves in a linear manner when actuating the valve. The interface between the two components is kept tight by the pressure from load spring 38 against gate seal 32. Gate seal 32 is comprised of a material such as a metal impregnated graphite composite which maintains a tight seal and also provides some limited degree of lubrication to allow gate 44 to slide thereby. Seal cap 34 allows access to these internal components for maintenance and replacement.

Figure 5:
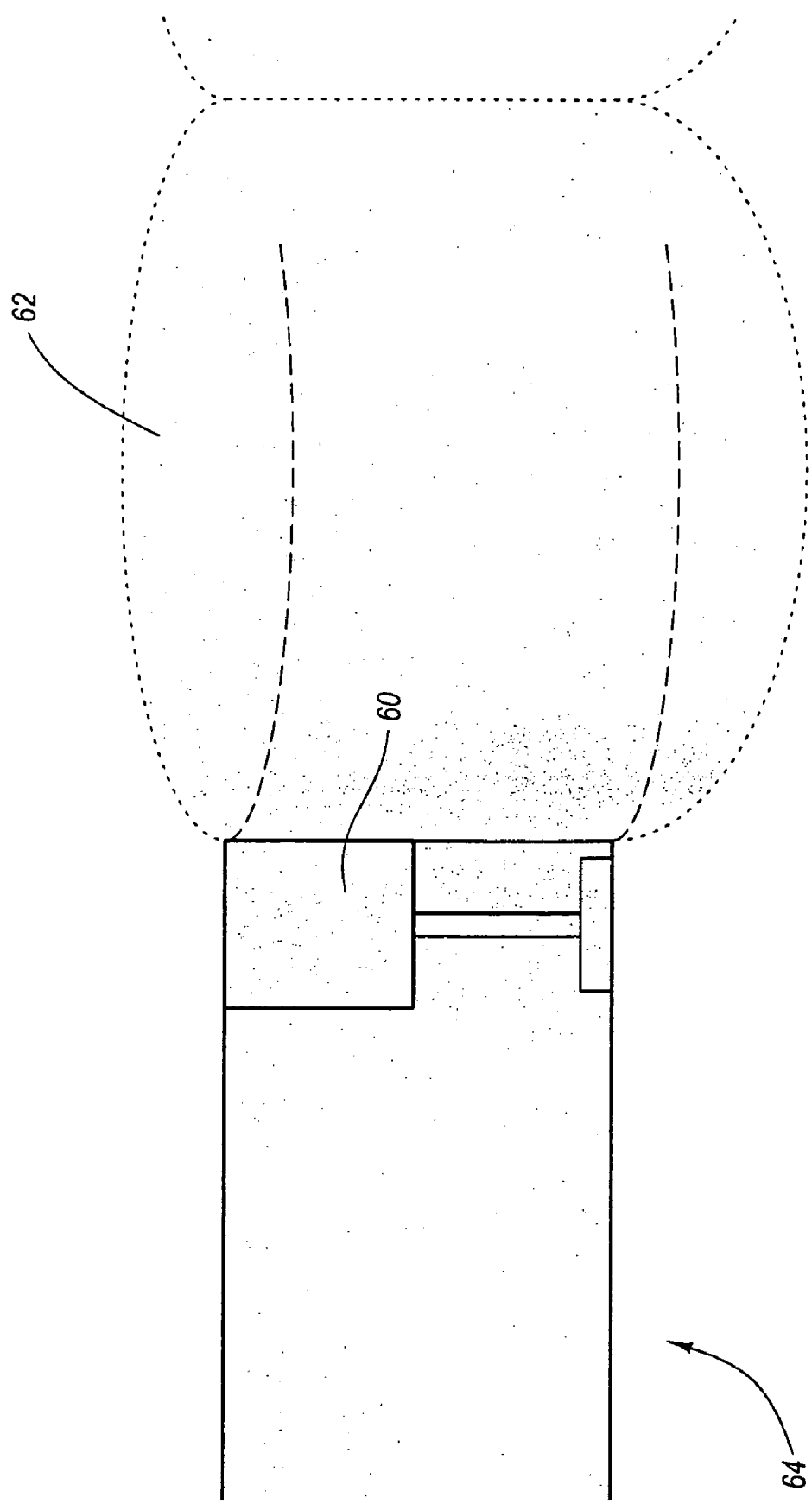
FIG. 5 is a cross-sectional view of a nose ring inside a blind.

FIG. 5 is a cross-sectional view of a nose ring 60 inside the orifice 62 of a blind 64. When used for throttling, the area around the orifice edge is exposed to harsh conditions including heat, friction and pressure. To increase the life of the blind, a replaceable nose ring 60 is installed. Nose ring 60 must have extremely close tolerances to remain attached to blind 64. Downward pressure on the inner edge will urge the ring out of the blind. To resist the pressure from coke traveling over the ring, a ring bolt or retainer extends from the lower face of the blind to secure the ring in place. The ring should be constructed of a strong material such as grade 512 chrome nitrided 4/10 stainless steel or other wear resistant material.

What is claimed is:

1. A system for preventing the escape of steam from a coke de-heading device comprising:
    a deheading device comprising;
        a main body removable attached to a coke drum;
        a blind seal coupled to the main body;
        a blind which slidably engages the blind seal; and
        a shroud, removably attached to the main body, surrounding the blind and the blind seal.

2. A system as recited in claim 1, wherein the blind is configured to selectively slide between an opened position and a closed position.

3. A system as recited in claim 1, further comprising one or more shroud cap return springs which bias a shroud cap end plate to prevent the release of steam from the valve body into the shroud.

4. A system as recited in claim 1, further comprising a shroud cap end plate which selectively overcomes a biasing pressure from one or more shroud cap return springs to release steam pressure.

5. A system as recited in claim 1, wherein the system is attached to a coke drum at a position selected from a group consisting of:
    (i) a flange on the bottom of the coke drum;
    (ii) a flange on the top of the coke drum; and
    (iii) a flange on the side of the coke drum.

6. A system as recited in claim 1, further comprising a gate seal assembly coupled to a body of the blind gate valve, wherein the gate seal assembly is configured to float within a guide cup to reduce an amount of steam from escaping from the body when pressurized.

7. A system as recited in claim 1, wherein the deheading device is selected from a group consisting of: a dual seated deheading device, a linear motion deheading device, and a goggle blind valve deheading device.

8. In a coke drum deheading system, a method of preventing the escape of steam from a coke-deheading device comprising:
    coupling a main body of a coke deheading system to a coke drum, wherein said coke deheading system comprises the main body, a blind, a blind seal and a shroud;
    coupling said seal to said main body;
    surrounding a gate valve of a coke deheading system with a shroud; and slideably engaging a blind against a blind seal assembly.

9. A method as recited in claim 8, wherein the blind is configured to selectively slide between an opened position and a closed position.

10. A method as recited in claim 9, further comprising the step of allowing a shroud cap end plate of the shroud to overcome a biasing pressure from one or more shroud cap return springs to release steam pressure from the valve body.

11. A method as cited in claim 10, further comprising the step of allowing one or more shroud cap return springs to bias the shroud cap end plate to prevent the continued release of steam.

12. The method as recited in claim 8, wherein the coupling of said main body to the coke drum further comprises a step consisting of:
    coupling the main body to the bottom of the coke drum;
    coupling the main body to the top of the coke drum; and
    coupling the main body to the side of the coke drum.

* * * * *